Aug. 10, 1937.   L'ROCHE G. BOUSQUET ET AL   2,089,180
PRODUCTION OF TITANIUM DIOXIDE
Filed Feb. 11, 1935
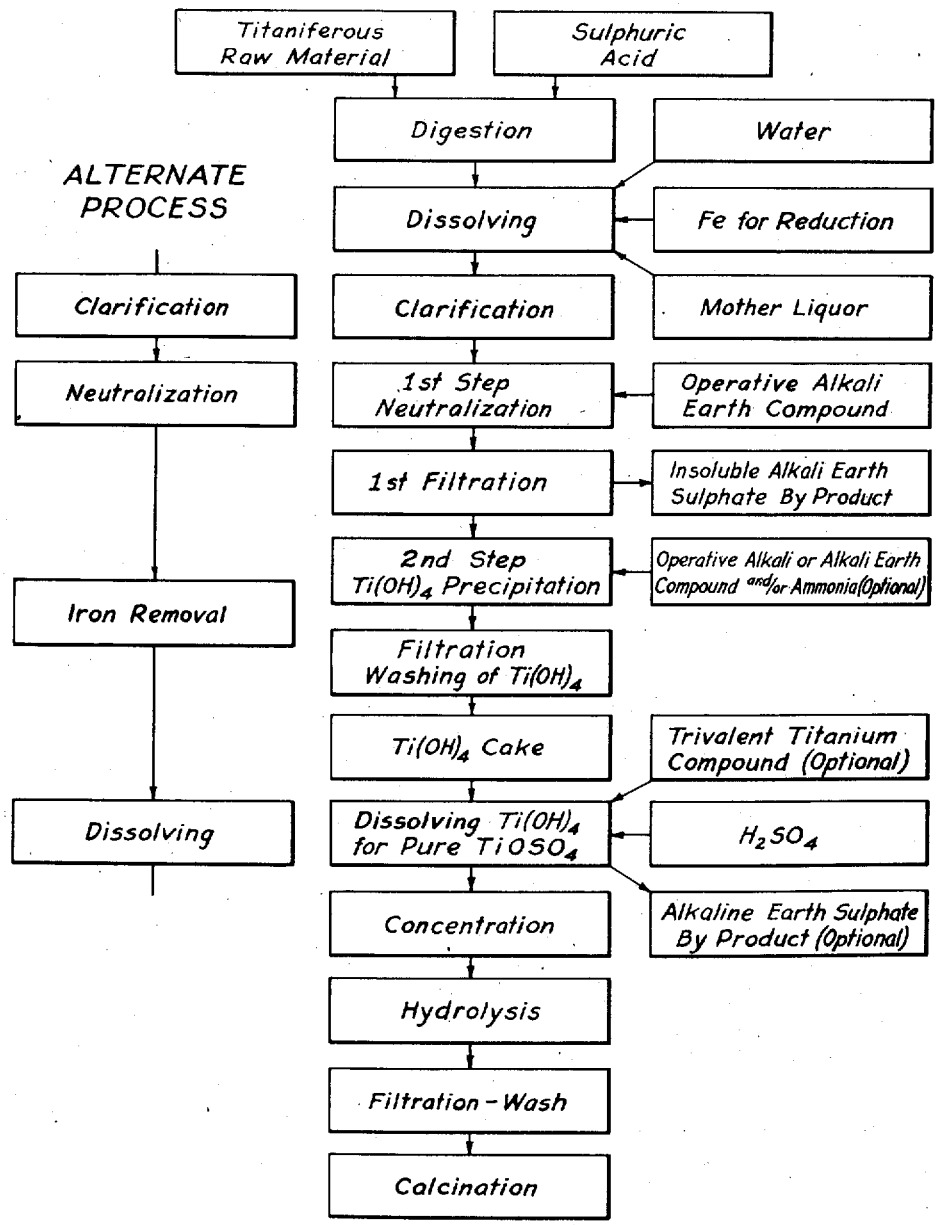
L'ROCHE G. BOUSQUET
HARTMUT W. RICHTER   INVENTORS
BENJAMIN WILSON ALLAN
BY Milton Zucker
ATTORNEY.

Patented Aug. 10, 1937

2,089,180

UNITED STATES PATENT OFFICE 2,089,180

PRODUCTION OF TITANIUM DIOXIDE

L'Roche G. Bousquet, Baltimore, Md., Hartmut W. Richter, Rahway, N. J., and Benjamin Wilson Allan, Baltimore, Md., assignors to American Zirconium Corporation, St. Helena, Baltimore, Md., a corporation of Maryland Application February 11, 1935, Serial No. 6,098

11 Claims. (Cl. 23—202)

This invention deals with a process for the manufacture of titanium dioxide pigment from titanium bearing ores. In particular the invention relates to a method for the separation of titanium from iron and other impurities, present in titanium ore and introduced in the course of processing, by the precipitation of the titanium as orthotitanic acid by means of alkali or alkaline earth compounds. By this process a purified titanium sulphate solution may be produced, which, upon boiling for from three to nine hours, will yield most of its titanium content as a white compound, without the addition of accelerating agents. Under certain conditions the washed hydrolysis product can be calcined to neutrality without the use of conditioning agents. Besides yielding titanium dioxide suitable as a pigment, a valuable by-product of an alkaline earth sulphate may be obtained. Another feature of this process is that the sulphuric acid in the mother liquor from the hydrolysis step can be recovered economically for re-use in the process.

At the present time titanium dioxide is produced for commerce principally by two methods. In both cases ilmenite, the titanium bearing ore, is digested with sulphuric acid. The resulting mass, containing mostly titanium and iron sulphates, is dissolved in water, weak acid, or reclaimed titanium liquor. During the dissolution of the titanium bearing mass, scrap iron is introduced into the liquor for the purpose of reducing all of the iron present to the ferrous state and also some of the titanium to titanous sulphate. The reduced liquor containing all of the undigested ore and other insoluble matter, is next clarified. This step is carried out either by filtration or coagulation and settling. Coagulation is attained by any of the well-known methods such as the introduction of a weak water solution of glue or by the use of nascent sulphur. Filtration is carried out by the addition of diatomaceous earth or some other filter-aid to the hot solid bearing titanium liquor before filtering.

Up to the clarification step, the two processes are fundamentally alike, except for such matters as preferred acid concentration, ratio of acid to ore, ore fineness, and the type of digestor used. From this point on, however, the two processes differ materially. In one, concentrated titanium sulphate solution is used, in which there is less sulphuric acid than required to form normal titanium sulphate and from which considerable of the ferrous sulphate has been removed by crystallization. Such concentrated titanium solutions, termed basic because of the acid deficiency, require seeding either by special treatment of the solution, or by the addition of a seeding material, for the economical production of meta titanic acid by boiling. The hydrolysis product is washed free of the mother liquor and after treating with a conditioning agent, is calcined.

In the second process in use, a composite pigment of calcium sulphate and meta titanic acid is prepared from a normal titanium sulphate solution. In this solution, by precipitation of the titanium in the presence of calcium sulphate, there is acid in excess over that necessary to form $Ti(SO_4)_2$. The solution is much lower in titanium but somewhat higher in iron than the solution previously described. After hydrolysis, the precipitated titanium is washed free of sulphates of iron and calcium, and the precipitate is calcined after treating with a conditioning agent to yield a neutral pigment.

In the case of neither of the above processes can the acid in the mother liquor from the hydrolysis step be recovered without incurring considerable practical difficulties, as indicated by the fact that it has been the practice to waste these acid liquors. Inasmuch as the cost of the sulphuric acid needed for the manufacture of titanium dioxide represents about one-half of the entire raw material cost, a process which facilitates its economical recovery is of commercial value.

The accompanying drawing is a flow sheet illustrative of the process claimed.

In the process that forms the subject of this invention, ilmenite is digested in sulphuric acid; the concentration of acid may be varied from 50–104.5% and the acid to ore ratio from 1.4 to 2.5 parts by weight. The digested mass is dissolved in water, or titanium bearing wash liquor recovered from subsequent steps in the process. Scrap iron is added in order to reduce all the iron present to the ferrous state. The resulting liquor is freed from solid matter by any of the well-known methods, but preferably by filtration after the addition of diatomaceous earth to the hot liquor. To the clarified titanium solution, which may vary between 50–250 grams per liter of $TiO_2$, a solution or slurry of operative alkali or alkaline earth compound (preferably an alkaline earth hydroxide or carbonate) is added until almost all, or all of the active sulphuric acid is neutralized. In the parlance of the art all the acid which is not combined with metals other than titanium is referred to as "active" acid. As a result, all of the titanium is precipitated as orthotitanic acid, while the iron and other metals remain in solution. The use of a deficiency of alkaline compound is essential if substantially complete iron separation is desirable, although fairly good results can be obtained with complete neutralization of the active acid if the washing of the orthotitanic acid cake is very complete. They are removed by filtration and washing. The washed orthotitanic acid cake, which may contain insoluble sulphates of the alkaline earths, is then dissolved in sulphuric acid, or in a mixture of titanium bearing acid wash liquor and enough additional sulphuric acid. In the liquor used for dissolving, it is advantageous to have titanium sulphate present. Any insoluble residue is removed by filtration, the filter cake being washed free of titanium sulphate by the use of acidulated water. This wash liquor can be added directly to the purified titanium solution, or can be utilized with additional acid and with or without the addition of titanous sulphate, to dissolve more orthotitanic acid, in a subsequent batch. The washed precipitate of alkaline earth sulphate, when obtained, forms a valuable by-product. It can be used before or after calcination.

The dilute titanium sulphate solution containing between 20–150 grams per liter $TiO_2$ may be now concentrated by evaporation under vacuum. During this concentration there may or may not be present titanous sulphate. Any precipitate appearing during the evaporation is preferably removed. The resulting concentrated and purified titanium solution is now ready for hydrolysis, which operation is carried out by boiling for from three to nine hours, the time depending upon the titanium and acid concentrations. The hydrolized product is filtered, washed free of mother liquor, and calcined with or without the addition of conditioning agents, between 700–1,000° C. The mother liquor is then evaporated to the desired acid concentration, cooled and freed from the crystalline mass of titanium and iron salts in any convenient manner. The acid obtained is used for digesting more ilmenite to produce titanium sulphate solution for use in the process.

It is to be understood that there are many modifications of this process, some of which will be represented in the examples given. For instance, it has been found advantageous to carry out the neutralization of the active acid in two steps, when alkaline earth compound forming an insoluble sulphate is used, the reason for this being that it is desirable to obtain the maximum titanium concentration in the purified solution in order to minimize the subsequent evaporation costs. This end is served when there is a minimum of foreign matter in the orthotitanic acid cake, and is accomplished by adding only enough base such as $Ca(OH)_2$, $CaCO_3$, etc. in the form of a slurry, to the titanium sulphate solution to neutralize the major part of the active sulphuric acid without precipitating any titanium. It has been found that the neutralization can be carried out to take care of all or almost all of the free acid, or, still further, to take care of 20 to 50% of the acid combined with the titanium in the compound $TiOSO_4$ without precipitating the latter, the free acid referred to being that part of the active acid over and above that needed to form $TiOSO_4$. Such solutions as are thereby produced are very basic, and metastable, requiring less than the theoretical amount of precipitant. This has the advantage of minimizing the amount of both precipitant used and of foreign matter formed in the orthotitanic acid cake. When the neutralization is carried out in two steps, the precipitation of the titanium as orthotitanic acid can be accomplished satisfactorily by either adding the base to the titanium solution or vice versa, or by mixing the two at such a rate as to maintain a constant pH.

It has also been found that a more concentrated purified titanium sulphate solution can be obtained when the orthotitanic acid cake is partially dehydrated. This dehydration should be carried out at low temperatures in order to avoid decreasing the solubility of the titanium compounds and also preferably in the absence of oxidizing conditions.

Although this process in its entirety is believed to be new, it makes use of ideas that are known to be old, no claim being made to those ideas as such. Thus, the use of alkali or alkaline earth bases, to precipitate titanium as orthotitanic acid, is old (see Rossi & Barton, U. S. Patent #1,196,029, Barton, U. S. Patent #1,234,260, Leuchs, U. S. Patent #1,853,626, Monk, U. S. Patent #1,755,512, among other); and Leuchs discloses the precipitation of orthotitanic acid by magnesium oxide, followed by dissolution of the orthotitanic acid and hydrolysis of the solution. Neither Leuchs nor other prior art workers used this method to get a substantially complete separation of iron and other metals from titanium.

The following examples are typical of our invention.

Example 1

Neutralization of the active acid in one step. To 780 cc. of solution 1A, 108 grams $Ca(OH)_2$ slurried in 10 parts of $H_2O$ were added in the cold, the mixture agitated until all of the lumps were broken up and the pulp filtered. The filter cake was washed, repulped in water and filtered and again washed with water. The washed cake was then dissolved in concentrated sulphuric acid and the insoluble residue removed by filtration. Analysis 1C represents the concentrated solution which was used for hydrolysis.

*Analysis:* (concentrations in grams per liter)

|  | 1A, original solution | 1B, purified solution | 1C, concentrated solution |
|---|---|---|---|
| $TiO_2$ | 94.4 | 61.0 | 254 |
| Fe | 59.0 | 3.4 | 14.2 |
| Zn | 31.1 | 20.1 | 83.7 |
| Total $H_2SO_4$ | 327 | 145.7 | 605 |
| Free $H_2SO_4$ (acid not combined with bases, or Ti as $TiOSO_4$) | 61 | 35 | 145.9 |
| Active $H_2SO_4$ (free acid plus acid in $TiOSO_4$) | 176.8 | 109.6 | 456 |
| Percent F. A. | 52.6 | 46.9 | 46.8 |

$$\text{Percent F. A.} = \frac{\text{Free acid} \times 100}{\text{Ti equivalent acid (based on } TiOSO_4)}$$

Example 2

To 2000 cc. of solution 2A, 520 grams NaOH dissolved in 6000 cc. $H_2O$ was added in the cold. The precipitate was filtered and washed with $H_2O$. After repulping and filtering twice, 73.9% of the total iron originally present had been removed. The following analysis shows the results obtained:

*Analysis*

|  | 2A, original solution | 2B, purified solution | 2C, concentrated solution |
|---|---|---|---|
| $TiO_2$, g/l | 126.4 | 92.3 | 195.1 |
| Fe | 90.7 | 13.6 | 27.0 |
| Total $H_2SO_4$ | 471.9 | 263.8 | 568.7 |
| Free $H_2SO_4$ | 103 | 126.9 | 282.3 |
| Active $H_2SO_4$ | 312.9 | 239.9 | 521.3 |
| Percent F. A. | 66.6 | 112 | 118 |
| Reduced $TiO_2$ (present as $Ti_2(SO_4)_3$) | .7 | | |

Example 3

Neutralization of the active acid in two steps. First step: To 5 liters of solution 3A, 1500 grams precipitated chalk slurried in 10 liters $H_2O$ were added in the cold, the mixture filtered and washed with 5 liters 1% $H_2SO_4$. At the end of the washing period the filtrate contained .08 gram per liter $TiO_2$. The composition of the filtrate plus the wash liquor is given in analysis 3X.

Analysis

|  | 3A, original solution | 3X, intermediate solution |
|---|---|---|
| Total $TiO_2$, g/l | 169.7 | 66.1 |
| Fe | 44.2 | 17.3 |
| Total $H_2SO_4$ | 522.0 | 95.5 |
| Free $H_2SO_4$ | 236.4 | −15.9 |
| Active $H_2SO_4$ | 444.4 | 65.1 |
| Percent F. A. | 114 | −19.6 |

It will be noted that there is insufficient acid to take care of all of the titanium as $TiOSO_4$ and the Fe as $FeSO_4$.

Second step: To filtrate 3X, heated to 60° C., 540 grams $CaCO_3$ slurried in 3 liters of $H_2O$ were added with stirring. The mixed precipitate was filtered off. The filtrate had the following analysis.

| $TiO_2$ | None |
|---|---|
| Fe | 12.4 g/l |
| $H_2SO_4$ | 21.6 g/l |
| Free $H_2SO_4$ | None |

The cake was washed on the filter with $H_2O$ and then added to 900 cc. of concentrated sulphuric acid. Considerable heat was liberated. The mixture was agitated and allowed to cool to room temperature and filtered. The filter cake was repulped in 1% sulphuric acid and filtered, yielding a clear solution containing 24 grams per liter $TiO_2$.

Analysis

|  | 3B, purified solution | 3C, conc. solution used for hydrolysis |
|---|---|---|
| $TiO_2$, g/l | 80.4 | 210.2 |
| Fe | 13.7 | 42.5 |
| Total $H_2SO_4$ | 208 | 590 |
| Free $H_2SO_4$ | 85.5 | 258 |
| Active $H_2SO_4$ | 184 | 515.5 |
| Percent F. A. | 86.8 | 99.7 |

The concentrated solution, on boiling for four hours, gave a 91.5% recovery of $TiO_2$.

Example 4

To 1350 cc. solution 4A, 104.8 grams $Ca(OH)_2$ slurried in 10 parts $H_2O$ were added in the cold. The precipitate was filtered and washed with 2.8 liters acidulated water. The combined filtrate and wash liquor had the composition shown by analysis 4B.

|  | 4A, original solution | 4B, intermediate solution |
|---|---|---|
| Total $TiO_2$, g/l | 126 | 31.1 |
| Reduced $TiO_2$, g/l | 51.2 | 11.7 |
| Fe | 113.6 | 29.7 |
| Total $H_2SO_4$ | 486.4 | 96.8 |
| Free $H_2SO_4$ | 133.4 | −6.6 |
| Active $H_2SO_4$ | 287.4 | 44.7 |
| Percent F. A. | 86.3 | −17.3 |
| Sp. gr. | 1.56 |  |
| Volume | 1.35L | 5,193L |

To 5,193 liters of solution 4B, 182 grams $Ca(OH)_2$ slurried in 600 cc. $H_2O$ were added in the cold. The precipitate was filtered and repulped. In all, the cake was repulped three times. The iron removal is shown in the following table.

| Operation | g/l Fe in filtrate | Percent Fe removed |
|---|---|---|
| 1st filtration | 14.8 | 80.2 |
| 1st repulping in $H_2O$ and filtr | 6.0 | 13.7 |
| 2nd repulping in $H_2O$ and filtr | 1.63 | 2.77 |
| 3rd repulping in $H_2O$ and filtr | .474 | 1.04 |
| Total |  | 97.71 |

The final orthotitanic acid cake was less hydrated than when only a small amount of titanous sulphate was present; namely 63% $H_2O$ instead of 80–83%, and the iron removal was improved.

The orthotitanic acid was dissolved in concentrated sulphuric acid, the $CaSO_4$ precipitate removed by filtration. The filtrate analyzed as follows:

Purified solution

| Total $TiO_2$ | 103.7 |
|---|---|
| Reduced $TiO_2$ | None |
| Fe | 1.06 |
| Total $H_2SO_4$ | 279.5 |
| Free $H_2SO_4$ | 150.6 |
| Active $H_2SO_4$ | 277.6 |
| Percent F. A. | 118 |
| Sp. gr. | 1.26 |

Example 5

Instead of adding the lime slurry to the partially neutralized solution, the reverse procedure was used with an improved iron removal and rate of filtration.

To 20 liters of solution 5A, 3440 grams $Ca(OH)_2$ repulped in 10 parts of $H_2O$ were added in the cold. The $CaSO_4$ was filtered off and the cake washed with 1% acid. The composition of the filtrate plus the wash liquor is shown in analysis B.

Analysis

|  | 5A, original solution | 5B, intermediate solution |
|---|---|---|
| Total $TiO_2$, g/l | 111.4 | 40.4 |
| Reduced $TiO_2$, g/l | .89 | Trace |
| Fe | 81.2 | 29.9 |
| Total $H_2SO_4$ | 497.2 | 105.3 |
| Free $H_2SO_4$ | 218.8 | −3.4 |
| Active $H_2SO_4$ | 355 | 52.8 |
| Percent F. A. | 160.7 | −6.88 |

To 868 grams $Ca(OH)_2$ slurried in 12 liters $H_2O$, 20 liters of solution 5B were added in the cold. The mixture was agitated and filtered. The orthotitanic acid cake was repulped and filtered four times with the following iron removal.

| Operation | g/l Fe | Percent Fe removal |
|---|---|---|
| 1st filtration |  16 | 49.5 |
| 1st repulping and filt | 7.7 | 23.6 |
| 2nd repulping and filt | 3.63 | 8.6 |
| 3rd repulping and filt | 1.6 | 4.02 |
| 4th repulping and filt | 1.1 | 3.98 |
| Total |  | 89.70 |

Example 6

By following the same procedure as used in Example 5 but using 10% deficiency of alkali, a better removal results.

A partially neutralized titanium solution with the following analysis was used:

| | |
|---|---|
| Total TiO₂ | 53.7 g/l |
| Fe | 39.4 |
| Total H₂SO₄ | 139.8 |
| Free sulphuric acid | 5.6 |
| Active sulphuric acid | 70.6 |
| Per cent F. A | 8.3 |

Seven liters of this solution were run into 349 grams Ca(OH)₂, stirred in 3½ liters of water, this being 90% of the amount of Ca(OH)₂ theoretically necessary to neutralize all of the active acid. The orthotitanic acid cake was filtered and washed and repulped twice. The results are shown in the following table:

| Operation | g/l Fe | Percent Fe removed |
|---|---|---|
| Filtration | 25.1 | 72.6 |
| 1st repulping and filt | 8.7 | 13.9 |
| 2nd repulping and filt | 3.7 | 7.5 |
| Total | | 94.0 |

Example 7

Treatment of partially neutralized titanium solution with H₂S or other soluble sulphides to remove heavy metals, before precipitation of the orthotitanic acid.

To three liters of solution of 7A, we added 387 grams Ca(OH)₂ in 7 liters H₂O. After agitation we filtered off the precipitate. We then passed in H₂S into the clarified filtrate and filtered off a yellow precipitate. The solution obtained is shown in analysis 7B.

*Analysis*

| | 7 A, original solution | 7 B, intermediate solution |
|---|---|---|
| Total TiO₂ g/l | 129.7 | 40.9 |
| Reduced TiO₂, g/l | Trace | Trace |
| Fe | 104.4 | 33.5 |
| Total H₂SO₄ | 509.4 | 121 |
| Free H₂SO₄ | 168.4 | −12 |
| Active H₂SO₄ | 326.4 | 62.1 |
| Percent F. A | 106.5 | −24 |

To 4 liters of solution 7B were added 202.8 grams NaOH dissolved in 3 liters H₂O. The solution was agitated, filtered, and then washed by repulping and filtering three times. The orthotitanic acid was then dissolved in concentrated sulphuric acid by adding the cake slowly to the acid and allowing the mixture to cool after the initial addition of cake. The solution obtained had the following composition (7C).

*Analysis*

| | Purified solution 7C | Conc. solution 7D used for hydrolysis |
|---|---|---|
| Total TiO₂ | 91.5 | 237.0 |
| Reduced TiO₂ | | 11.0 |
| Fe | 10.1 | 18.6 |
| Zn | None | 18.0 |
| Total H₂SO₄ | 245.6 | 595 |
| Free H₂SO₄ | 115.9 | 248.1 |
| Active H₂SO₄ | 227.9 | 538.1 |
| Percent F. A | 103 | 85.8 |

The concentrated solution, on boiling for six hours, gave an 87% recovery of TiO₂.

The hydrogen sulphide of this example may be replaced by sodium sulphide, or other sulphides soluble in the solution. If the recovery of the sulphate is unfeasible economically, the sulphide treatment may be made before separation of the sulphate, enabling both precipitates to be filtered off at one time.

Example 8

Removal of Mn by the use of ammonia salts when precipitating the titanium.

To 1 liter of solution 8A, 162 grams of CaCO₃ slurried in 620 ccs. H₂O were added in the cold. 100 grams NH₄Cl were added, followed by the addition of 55 cc. of 28.3% NH₃. The precipitate was filtered and washed with 1 liter H₂O followed by repulping in 2 liters of H₂O, filtration and washing of the cake with 1 liter of H₂O. The repulping operation was repeated.

The original filtrate showed the presence of Mn.

After dissolving the orthotitanic acid cake in concentrated sulphuric acid and removing the precipitate by filtration, followed by washing, purified titanium solution of a composition shown in analysis 8C was obtained.

*Analysis*

| | 8A, original solution | 8C, purified solution |
|---|---|---|
| Total TiO₂, g/l | 94.4 | 51.2 |
| Reduced TiO₂, g/l | 3 | None |
| Fe | 59 | 1.6 |
| Zn | 31.1 | Undetermined |
| Total H₂SO₄ | 327.0 | 142.8 |
| Free H₂SO₄ | 61 | |
| Active H₂SO₄ | 176.8 | |
| MnO | 1.12 | Traces only |

Example 9

Neutralization in two steps and the use of ammonia to remove Mn.

To 5 liters of solution 9A, 528 grams CaCO₃ slurried in 5.3 liters H₂O were added in the cold. The precipitate was washed with 3 liters of 1% sulphuric acid. To the combined filtrate and wash liquor 80% of the necessary alkali to neutralize the active acid was added. This required 216 grams CaCO₃ slurried in 2 liters H₂O. After agitating the mixture for 15 minutes, 72 cc. 28.5% NH₃ was added. The precipitate was filtered and washed, followed by two repulpings and filtrations. All washing was done with extremely weak acid (.025–.05% H₂SO₄). The washed titanium cake was dissolved in concentrated acid, the precipitate of CaSO₄ removed by filtration and washed with 1% sulphuric acid. The wash liquor was kept separate from the filtrate. The composition of the latter is shown in analysis 9C.

*Analysis*

| | 9A, original solution | 9C, purified solution |
|---|---|---|
| Total TiO₂, g/l | 42.7 | 120.7 |
| Reduced TiO₂, g/l | 7.2 | None |
| Fe | 50.6 | .6 |
| Total H₂SO₄ | 244.4 | 607.4 |
| Free H₂SO₄ | 103.2 | |
| Active H₂SO₄ | 155.5 | |
| MnO | 0.51 | 0.16 |
| Percent F. A | 198 | |

It should be noted that not only is most of the manganese removed but the iron removal is especially good. The use of ammonium to complete the precipitation of the titanium makes it possible to make a separation of titanium from all of those metals forming complex ions with ammonia in addition to removing iron and manganese.

Example 10

Producing an extremely basic solution in the first neutralization

It has been found that a large part of the acid combined with the titanium in the compound $TiOSO_4$ can be neutralized without causing precipitation of the titanium. Advantage can be taken of this fact to use a soluble alkali with which to precipitate the titanium in the final step, thereby obtaining a hydrate free of foreign matter. To 3 liters of solution 10A, 635.5 grams $Ca(OH)_2$ slurried in 8 liters $H_2O$ were added in the cold. The mixture was thoroughly agitated and then filtered. The filter cake was washed with 1% sulphuric acid. The combined filtrate and wash liquor had the composition shown by analysis 10B. Solution 10C was produced by dissolving the orthotitanic acid in sulphuric acid produced by the addition of the required amount of NaOH to solution 10B.

Analysis

|  | 10A, original solution | 10B, intermediate solution | 10C, purified solution |
| --- | --- | --- | --- |
| Total $TiO_2$ | 129.7 | 29.7 | 91.5 |
| Reduced $TiO_2$ | Trace | Trace | None |
| Fe | 104.4 | 24.9 | 4.7 |
| Total $H_2SO_4$ | 509.4 | 60.5 | 198.4 |
| Free $H_2SO_4$ | 168.4 | −19.7 | 78.1 |
| Active $H_2SO_4$ | 326.4 | 16.8 | 190 |
| Percent F. A | 106.5 | −54.2 | 69.5 |

Example 11

Recoveries obtained when neutralization is carried out in two steps, with the use of titanous sulphate crystals.

To 3 liters of solution 11A, 240 grams of $Ca(OH)_2$ slurried in 3.4 liters $H_2O$ were added in the cold. After the reaction was complete the $CaSO_4$ was removed by filtration and the filter cake washed with 1.3 liters of 1% sulphuric acid. A total volume of 7 liters of solution 11B was obtained.

Analysis

|  | 11 A, original solution | 11 B, neutral solution |
| --- | --- | --- |
| Total $TiO_2$, g/l | 126.4 | 53.7 |
| Reduced $TiO_2$, g/l | 7.1 |  |
| Fe | 92.1 | 39.4 |
| Total $H_2SO_4$ | 418.6 | 139.8 |
| Free $H_2SO_4$ | 102.0 | −5.6 |
| Active $H_2SO_4$ | 257 | 70.6 |
| Percent F.A | 66.3 | −8.3 |
| Percent recovery |  | 99.3 |

To 349 grams $Ca(OH)_2$ (90% of theoretical amount required) slurried in 3.5 liters $H_2O$, 7 liters of solution B were added with stirring. After the reaction was complete, the orthotitanic acid was filtered and washed with 1 liter $H_2O$. 6.75 liters of filtrate containing 24.7 grams per liter Fe (69.5% Fe removal) were obtained before washing. Washing yielded 1.3 liters of wash liquor containing 25.1 grams per liter of Fe with a removal of Fe of 12.1%. This washed filter cake was repulped in 3.5 liters $H_2O$ filtered and washed. The total volume of filtrate was 4.4 liters containing 8.79 grams per liter Fe, corresponding to 13.9% of the original Fe present. A second repulping and washing removed 7.5% more iron, giving a total Fe removal of 95%. The wet cake weighed 4190 grams, corresponding to 9% $TiO_2$. It was dissolved in 417 cc. of 66° Bé. sulphuric acid diluted with 400 cc. $H_2O$, and in which 100 grams of titanous sulphate crystals were dissolved. These crystals had the following analysis:

|  | Percent |
| --- | --- |
| Total $TiO_2$ | 11.7 |
| Reduced $TiO_2$ | 11.0 |
| Total Fe | .7 |
| Total $H_2SO_4$ | 54.0 |

The $CaSO_4$ was removed by filtration and the filter cake washed, the wash liquor being added to the filtrate. After concentration and filtration, the solution had the following composition.

|  | 11D, concentrated solution | 11E, solution used for hydrolysis |
| --- | --- | --- |
| Total $TiO_2$ | 269.6 | 250 |
| Reduced $TiO_2$ | .8 | 2.5 |
| Fe | 14.2 | 13.2 |
| Total $H_2SO_4$ | 573.5 | 532.5 |
| Free $H_2SO_4$ | 218.5 |  |
| Active $H_2SO_4$ | 548.5 | 510 |
| Percent F. A | 66 | 66 |
| Percent $TiO_2$ recovery | 99 |  |

The concentrated solution, on boiling for four hours, gave a 94% recovery of $TiO_2$ The pigment obtained from solution 11E was extremely white and possessed the desired pigment properties such as high covering power, brightness, etc.

Example 12

Titanium and acid concentration for hydrolysis.

A wide range of acid and titanium concentrations may be used in the final solution, to give good recovery of titanium by simple boiling. The following table shows various examples of recoveries obtained from solutions prepared according to our invention.

| No. | 81 | 88 | 93A | 99 | 104 |
| --- | --- | --- | --- | --- | --- |
| Total $TiO_2$, g/l | 156.0 | 181.7 | 243.5 | 324.4 | 278.7 |
| Reduced $TiO_2$, g/l | 4.63 | 4.14 | 5.28 | 4.1 | 8.8 |
| Fe | 15.4 | 19.5 | 36.5 | 31.9 | 24.8 |
| Total $H_2SO_4$ | 406.5 | 481.5 | 625.6 | 656 | 592.9 |
| Free $H_2SO_4$ | 189.2 | 225.2 | 263 | 204 | 207.4 |
| Active $H_2SO_4$ | 380.2 | 447.2 | 561.6 | 600 | 549.4 |
| Percent F. A | 99.3 | 101.5 | 87.9 | 51.3 | 60.5 |
| Sp. gr. |  | 1.44 | 1.6 |  |  |
| Percent recovery | 94.6 in 5 hrs. | 88.6 in 5.6 hrs. | 74 in 8 hrs. | 80.9 in 6 hrs. | 94.8 in 8.5 hrs. |

| No. | 92B | 83 |
|---|---|---|
| Total TiO₂, g/l | 237.0 | 200.0 |
| Reduced TiO₂, g/l | 13.3 | 7.0 |
| Fe | 18.6 | 4.20 |
| Zn | 20 | 15 |
| Total H₂SO₄ | 595 | 515.0 |
| Free H₂SO₄ | 248.1 | 187.5 |
| Active H₂SO₄ | 538.1 | 430 |
| Percent F. A. | 85.8 | 77 |
| Sp. gr. |  | 1.5 |
| Percent recovery | 90 in 6 hrs. | 85 in 5 hrs. |

In the examples, the calcium compounds may, of course, be replaced by barium and strontium, sodium compounds by potassium, or other alkaline bases giving soluble sulphates.

While we have shown various ways of practicing our invention, it consists essentially in the precipitation of orthotitanic acid by an alkali, followed by dissolution concentration and hydrolysis, practicing the method in such a manner that the orthotitanic acid precipitate is very low in iron and other impurities. In particular, the removal of iron is facilitated by two stage precipitation, using alkaline earth base in the first stage, followed by removal of the sulphate formed, which results in a less bulky precipitate from which to wash the iron. The use of not quite the theoretical quantity of alkali likewise helps in the iron removal, as in this manner a slight acidity is maintained which is sufficient to prevent appreciable precipitation of the iron.

The use of ammonia to help in the removal of the iron, and to remove soluble compounds of manganese, is also considered by us as part of our invention.

The use of the two stage process likewise permits the removal of other impurities, by the use of hydrogen sulphide or ammonia, the addition being made to the intermediate solution. It should be pointed out that the proper acidity for the hydrogen sulphide may be obtained in this way, and, of course, economy in the use of ammonia is effected.

The use of titanous sulphate, in crystalline form, to reduce whatever iron is present in the purified solution, permits of hydrolysis without the introduction of foreign materials into the batch. The titanous sulphate may be replaced by any soluble titanous compound whose acid radical will not interfere with the hydrolysis; e. g. titanous fluoride.

Our process has two principal advantages besides economy—the preparation of hydrolysis solutions which need no internal or external seeding and of solutions low in impurities which permit the reuse of the mother liquor. In addition, when a two stage precipitation is made, and a soluble alkali is used in the second stage, the hydrolysis product calcines to neutrality without added conditioning agent, probably due to the presence of occluded alkali salt.

We claim:

1. The steps in the method of making titanium oxide which comprise treating a titanium sulphate solution with operative alkaline earth metal compound forming a relatively insoluble sulphate, in such quantity as not to cause precipitation of titanium, separating the insoluble sulphates from the solution, treating the solution with just enough of an operative compound of a member selected from the group consisting of the alkali and alkaline earth metals to precipitate only the titanium present, separating the precipitate, washing out impurities, and dissolving the purified precipitate.

2. The method of claim 1, in which all or part of the titanium precipitating agent is ammonia.

3. The method of claim 1, in which the titanium hydrate precipitate is redissolved in acid in the presence of an added soluble compound of trivalent titanium.

4. The steps in the method of making titanium oxide which comprise treating a titanium sulphate solution with operative alkaline earth metal compound forming a relatively insoluble sulphate, in such quantity as to reduce the factor of acidity to less than zero, without precipitating titanium, separating the insoluble sulphates from the solution, treating the solution with just enough of an operative compound of a member selected from the group consisting of the alkali and alkaline earth metals to precipitate only the titanium present, separating the precipitate, washing out impurities, and dissolving the purified precipitate.

5. The method of claim 4 in which all or part of the titanium precipitating agent is ammonia.

6. The method of claim 4, in which the titanium hydrate precipitate is redissolved in acid in the presence of an added soluble compound of trivalent titanium.

7. The steps in the method of making titanium oxide, which comprise treating titanium sulphate solution with operative alkaline earth metal compound forming relatively insoluble sulphate, in such quantity as not to cause precipitation of titanium, separating the insoluble sulphate from the solution, treating the solution with a soluble sulphide, separating the precipitate from the solution, treating the solution with just enough of an operative compound of a member of the alkali or alkaline earth group to precipitate only the titanium present, separating the pricipitate, washing out impurities and dissolving the purified precipitate.

8. The method of claim 7, in which all or part of the titanium precipitating agent is ammonia.

9. The method of claim 7, in which the titanium hydrate precipitate is redissolved in acid in the presence of an added soluble compound of trivalent titanium.

10. The method of making titanium dioxide which comprises dissolving a titaniferous material in sulphuric acid to form an impure titanium sulphate solution, treating the solution with operative alkaline earth metal compound forming a relatively insoluble sulphate, in such quantity as not to cause precipitation of titanium, separating the insoluble sulphates from the solution, treating the solution with just enough of an operative compound of a member of the alkali or alkaline earth group to precipitate only the titanium present, separating the precipitate, washing out impurities, dissolving the purified precipitate, adjusting the concentration of the solution, hydrolyzing, separating the precipitate, washing and calcining to titanium dioxide.

11. The method of making titanium dioxide which comprises dissolving a titaniferous material in sulphuric acid to form an impure titanium sulphate solution, treating the solution with operative alkaline earth metal compound forming a relatively insoluble sulphate, in such quantity as to reduce the factor of acidity to less than zero without precipitating titanium, separating the insoluble sulphates from the solution, treating the solution with just enough of an operative compound of a member selected from the group consisting of the alkali and alkaline earth metals to precipitate only the titanium present, separating the precipitate, washing out impurities, dissolving the purified precipitate, adjusting the concentration of the solution, hydrolizing, separating the precipitate, washing and calcining to titanium dioxide.

L'ROCHE G. BOUSQUET.
HARTMUT W. RICHTER,
BENJAMIN WILSON ALLAN.

Certificate of Correction

Patent No. 2,089,180. August 10, 1937.

L'ROCHE G. BOUSQUET ET AL.

It is hereby certified that error appears in the printed specification of the above numbered patent requiring correction as follows: Page 4, second column, line 69, in the table, for the figure "0.16" read *.016*; and that the said Letters Patent should be read with this correction therein that the same may conform to the record of the case in the Patent Office.

Signed and sealed this 21st day of September, A. D. 1937.

[SEAL]

HENRY VAN ARSDALE,
*Acting Commissioner of Patents.* compound of a member selected from the group consisting of the alkali and alkaline earth metals to precipitate only the titanium present, separating the precipitate, washing out impurities, dissolving the purified precipitate, adjusting the concentration of the solution, hydrolizing, separating the precipitate, washing and calcining to titanium dioxide.

L'ROCHE G. BOUSQUET.
HARTMUT W. RICHTER,
BENJAMIN WILSON ALLAN.

Certificate of Correction

Patent No. 2,089,180. August 10, 1937.

L'ROCHE G. BOUSQUET ET AL.

It is hereby certified that error appears in the printed specification of the above numbered patent requiring correction as follows: Page 4, second column, line 69, in the table, for the figure "0.16" read *.016*; and that the said Letters Patent should be read with this correction therein that the same may conform to the record of the case in the Patent Office.

Signed and sealed this 21st day of September, A. D. 1937.

[SEAL]

HENRY VAN ARSDALE,
*Acting Commissioner of Patents.*

Certificate of Correction

Patent No. 2,089,180. August 10, 1937.

L'ROCHE G. BOUSQUET ET AL.

It is hereby certified that error appears in the printed specification of the above numbered patent requiring correction as follows: Page 4, second column, line 69, in the table, for the figure "0.16" read *.016*; and that the said Letters Patent should be read with this correction therein that the same may conform to the record of the case in the Patent Office.

Signed and sealed this 21st day of September, A. D. 1937.

[SEAL]

HENRY VAN ARSDALE,
*Acting Commissioner of Patents.*